US009253304B2

(12) United States Patent
Bhogal et al.

(10) Patent No.: US 9,253,304 B2
(45) Date of Patent: Feb. 2, 2016

(54) VOICE COMMUNICATION MANAGEMENT

(75) Inventors: Kulvir S. Bhogal, Pflugerville, TX (US); Michael C. Hollinger, Round Rock, TX (US); Jennifer E. King, Austin, TX (US); Christina K. Lauridsen, Austin, TX (US); Robert R. Peterson, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1146 days.

(21) Appl. No.: 12/962,111

(22) Filed: Dec. 7, 2010

(65) Prior Publication Data

US 2012/0143596 A1 Jun. 7, 2012

(51) Int. Cl.
| | |
|---|---|
| G06F 17/27 | (2006.01) |
| G06F 17/28 | (2006.01) |
| G10L 25/03 | (2013.01) |
| H04M 1/725 | (2006.01) |
| G06F 17/21 | (2006.01) |
| G10L 25/00 | (2013.01) |

(52) U.S. Cl.
CPC ........... *H04M 1/72522* (2013.01); *G06F 17/27* (2013.01); *G06F 17/28* (2013.01); *G06F 17/21* (2013.01); *G10L 25/00* (2013.01); *G10L 25/03* (2013.01); *H04M 2250/74* (2013.01)

(58) Field of Classification Search
USPC ............... 704/1, 3, 4, 8, 9, 10, 200, 201, 206, 704/231–255, 258, 260, 270–272, 274, 704/E15.001–E15.05; 379/52, 156–166
See application file for complete search history.

(56) References Cited

U.S. PATENT DOCUMENTS

| | | | | |
|---|---|---|---|---|
| 4,081,614 | A * | 3/1978 | Dahlquist et al. | 379/49 |
| 5,127,003 | A * | 6/1992 | Doll et al. | 370/259 |
| 5,583,933 | A * | 12/1996 | Mark | 379/357.04 |
| 5,799,074 | A * | 8/1998 | Mano | H04M 9/002 379/142.01 |
| 5,918,222 | A * | 6/1999 | Fukui et al. | |
| 6,119,084 | A * | 9/2000 | Roberts | G10L 17/20 704/243 |
| 6,205,261 | B1 * | 3/2001 | Goldberg | 382/310 |
| 6,404,859 | B1 * | 6/2002 | Hasan | G10L 15/30 379/88.04 |

(Continued)

FOREIGN PATENT DOCUMENTS

WO 2008028286 A1 3/2008

OTHER PUBLICATIONS

"How Net Nanny enhances Microsoft Vista's Parental Controls," ContentWatch, Inc., dated Aug. 14, 2009, 1 page. Retrieved Feb. 22, 2013 from http://web.archive.org/web/20090814133036/http://www.netnanny.com/learn_center/vista.

(Continued)

*Primary Examiner* — Pierre-Louis Desir
*Assistant Examiner* — David Kovacek
(74) *Attorney, Agent, or Firm* — Yee & Associates, P.C.; William J. Stock

(57) ABSTRACT

A method, a computer program product, and an apparatus for managing a voice communication are provided. In one illustrative embodiment, an audio phrase produced by a first user is identified in the voice communication between the first user and a second user. A determination is made whether the audio phrase is present in a policy which prohibits the transmission of the set of undesired audio phrases. Responsive to a determination that the audio phrase is present in the policy which prohibits the transmission of the set of undesired audio phrases, a communication of the audio phrase is modified.

18 Claims, 7 Drawing Sheets

(56) References Cited

U.S. PATENT DOCUMENTS

| | | | |
|---|---|---|---|
| 6,446,076 B1* | 9/2002 | Burkey et al. | 704/270.1 |
| 6,462,264 B1* | 10/2002 | Elam | 84/645 |
| 6,807,563 B1* | 10/2004 | Christofferson et al. | 709/204 |
| 6,895,084 B1* | 5/2005 | Saylor et al. | 379/88.22 |
| 6,963,759 B1* | 11/2005 | Gerson | 455/563 |
| 7,013,263 B1* | 3/2006 | Isaka et al. | 704/9 |
| 7,139,031 B1* | 11/2006 | Bray | 348/468 |
| 7,283,820 B2* | 10/2007 | Kamijo et al. | 455/435.1 |
| 7,366,662 B2* | 4/2008 | Visser et al. | 704/227 |
| 7,383,183 B1* | 6/2008 | Davis | G06Q 50/22 704/235 |
| 7,444,403 B1* | 10/2008 | Packer et al. | 709/224 |
| 7,558,828 B1* | 7/2009 | Panzer | 709/206 |
| 7,584,101 B2* | 9/2009 | Mark et al. | 704/251 |
| 7,978,827 B1* | 7/2011 | Becker et al. | 379/52 |
| 8,144,854 B2* | 3/2012 | Rodman | 379/202.01 |
| 8,229,742 B2* | 7/2012 | Zimmerman | G06F 19/322 380/277 |
| 8,244,531 B2* | 8/2012 | Erhart et al. | 704/249 |
| 8,284,905 B1* | 10/2012 | Suri | H04M 3/2281 379/265.07 |
| 8,423,363 B2* | 4/2013 | Gupta et al. | 704/255 |
| 8,463,606 B2* | 6/2013 | Scott et al. | 704/232 |
| 8,503,652 B2* | 8/2013 | Chen | H04M 3/56 370/260 |
| 8,571,534 B1* | 10/2013 | Reeves et al. | 455/418 |
| 2002/0013692 A1* | 1/2002 | Chandhok et al. | 704/1 |
| 2002/0059379 A1* | 5/2002 | Harvey et al. | 709/205 |
| 2002/0065658 A1* | 5/2002 | Kanevsky et al. | 704/260 |
| 2002/0103647 A1* | 8/2002 | Houplain | 704/260 |
| 2002/0116345 A1 | 8/2002 | Harrison | |
| 2002/0198722 A1* | 12/2002 | Yuschik | 704/275 |
| 2003/0041108 A1* | 2/2003 | Henrick et al. | 709/205 |
| 2003/0044654 A1* | 3/2003 | Holt | 429/13 |
| 2003/0061111 A1 | 3/2003 | Dutta et al. | |
| 2003/0177009 A1* | 9/2003 | Odinak et al. | 704/260 |
| 2004/0111479 A1* | 6/2004 | Borden et al. | 709/206 |
| 2004/0143438 A1* | 7/2004 | Cabezas | G06F 21/64 704/260 |
| 2004/0166832 A1* | 8/2004 | Portman et al. | 455/412.1 |
| 2004/0224769 A1* | 11/2004 | Hansen et al. | 463/40 |
| 2004/0225650 A1* | 11/2004 | Cooper et al. | 707/3 |
| 2005/0055213 A1* | 3/2005 | Claudatos et al. | 704/270.1 |
| 2005/0114133 A1* | 5/2005 | Mark et al. | 704/251 |
| 2006/0009982 A1* | 1/2006 | Janzen | 704/272 |
| 2006/0053380 A1* | 3/2006 | Spataro et al. | 715/753 |
| 2006/0080263 A1 | 4/2006 | Willis et al. | |
| 2006/0095262 A1* | 5/2006 | Danieli | 704/251 |
| 2006/0095268 A1* | 5/2006 | Yano et al. | 704/275 |
| 2006/0106611 A1* | 5/2006 | Krasikov et al. | 704/270 |
| 2006/0262920 A1* | 11/2006 | Conway et al. | 379/265.02 |
| 2007/0061150 A1* | 3/2007 | Sawano | G07C 9/00158 704/275 |
| 2007/0067387 A1* | 3/2007 | Jain et al. | 709/204 |
| 2007/0083361 A1* | 4/2007 | Ferencz | G10K 11/175 704/201 |
| 2007/0100603 A1* | 5/2007 | Warner et al. | 704/9 |
| 2007/0244700 A1* | 10/2007 | Kahn | G10L 15/22 704/235 |
| 2008/0063174 A1* | 3/2008 | Patel et al. | 379/202.01 |
| 2008/0108324 A1 | 5/2008 | Moshir et al. | |
| 2008/0126480 A1* | 5/2008 | Hintermeister et al. | 709/204 |
| 2008/0165937 A1* | 7/2008 | Moore | 379/88.04 |
| 2008/0221882 A1* | 9/2008 | Bundock et al. | 704/235 |
| 2008/0294439 A1* | 11/2008 | Kirby | 704/251 |
| 2008/0307339 A1* | 12/2008 | Boro et al. | 715/764 |
| 2009/0089062 A1* | 4/2009 | Lu | 704/270 |
| 2009/0100184 A1 | 4/2009 | Chakra et al. | |
| 2009/0249244 A1* | 10/2009 | Robinson et al. | 715/781 |
| 2009/0306981 A1* | 12/2009 | Cromack et al. | 704/235 |
| 2010/0082342 A1* | 4/2010 | Erhart et al. | 704/246 |
| 2010/0131858 A1* | 5/2010 | Schultz et al. | 715/751 |
| 2010/0151889 A1* | 6/2010 | Chen et al. | 455/466 |
| 2010/0169073 A1* | 7/2010 | Almagro | 704/3 |
| 2010/0169480 A1* | 7/2010 | Pamidiparthi | H04L 51/14 709/224 |
| 2010/0274679 A1* | 10/2010 | Hammad | 705/21 |
| 2010/0324894 A1* | 12/2010 | Potkonjak | 704/235 |
| 2011/0010173 A1* | 1/2011 | Scott et al. | 704/235 |
| 2011/0043652 A1* | 2/2011 | King et al. | 348/222.1 |
| 2011/0087485 A1* | 4/2011 | Maude et al. | 704/9 |
| 2011/0124362 A1* | 5/2011 | Wakasa | G06F 3/16 455/511 |
| 2011/0191105 A1* | 8/2011 | Spears | 704/251 |
| 2011/0261807 A1* | 10/2011 | Walters et al. | 370/352 |
| 2011/0286584 A1* | 11/2011 | Angel | G10L 15/26 379/88.02 |
| 2012/0143596 A1* | 6/2012 | Bhogal | H04M 1/72522 704/9 |
| 2012/0143728 A1 | 6/2012 | Bhogal et al. | |

OTHER PUBLICATIONS

"Phishing Protection | TippingPoint Intrusion Prevention," 3COM Corporation, dated Feb. 26, 2010, 4 pages. Retrieved Feb. 22, 2013 from http://web.archive.org/web/20100226084638/http://www.tippingpoint.com/technology_phishing.html.

"Internet Filter Software Review," TopTenREVIEWS, Inc., dated Jul. 17, 2010, 4 pages. Retrieved Feb. 20, 2013 from web.archive.org/web/20100717051338/http://internet-filter-review.toptenreviews.com/.

* cited by examiner

VOICE COMMUNICATION MANAGEMENT

BACKGROUND

1. Field:

The disclosure relates generally to an improved data processing system and more specifically to voice communications in data processing systems. Even more specifically, the disclosure relates to a method, computer program product, and apparatus for managing a voice communication.

2. Description of the Related Art

Voice communications are often employed by users to send and receive information. A voice communication is a collection of messages in the form of spoken words between two or more users. An example of a voice communication is a telephone call between two users. Voice communications are frequently used to conduct transactions between users. For example, a customer may call a salesperson to order a product sold by the salesperson.

In conducting the transactions, users are frequently requested to provide confidential information to a receiving party. The receiving party may request the confidential information to verify the identity of the user and/or complete a transaction, such as discussing the details of a bank account or making a purchase. The confidential information is data or an identifier known only to the user. The confidential information may include a passcode, bank account number, credit card number, social security number, or other suitable identifiers. Once the receiving party receives the confidential information, the receiving party completes the transaction, discusses the details of the account, or another suitable activity.

Some unauthorized parties attempt to receive confidential information belonging to other users. In the event that the confidential information becomes known to an unauthorized party, the confidential information may be used by the unauthorized parties to perform unauthorized activities on behalf of the user. For example, an unauthorized party may use the credit card number of a user to make a purchase for the benefit of the unauthorized party without the consent of the authorized party.

In some examples, an unauthorized party attempts to receive confidential information by contacting a user using voice communication and alleging that the unauthorized party is associated with a party trusted by the user. For example, an unauthorized party may call a user using a telephone and state that the unauthorized party is an employee of a bank with which the user has an account. The unauthorized party may also request confidential information from the user. For example, the unauthorized party may state that the bank is updating the records of the bank and that the account of the user may be closed if the user does not provide the social security number of the user.

Some users may recognize the attempt to receive the confidential information by the unauthorized party and end the voice communication or report the unauthorized party to the authorities. However, other users may not recognize the attempt to receive the confidential information and trust the allegation that the unauthorized party is associated with the party trusted by the user. Thus, some users may speak the requested confidential information to the unauthorized party during the voice communication.

SUMMARY

A method, a computer program product, and an apparatus for managing a voice communication are provided. In one illustrative embodiment, an audio phrase produced by a first user is identified in the voice communication between the first user and a second user. A determination is made whether the audio phrase is present in a policy which prohibits the transmission of the set of undesired audio phrases. Responsive to a determination that the audio phrase is present in the policy which prohibits the transmission of the set of undesired audio phrases, a communication of the audio phrase is modified.

DETAILED DESCRIPTION

Figure 1:
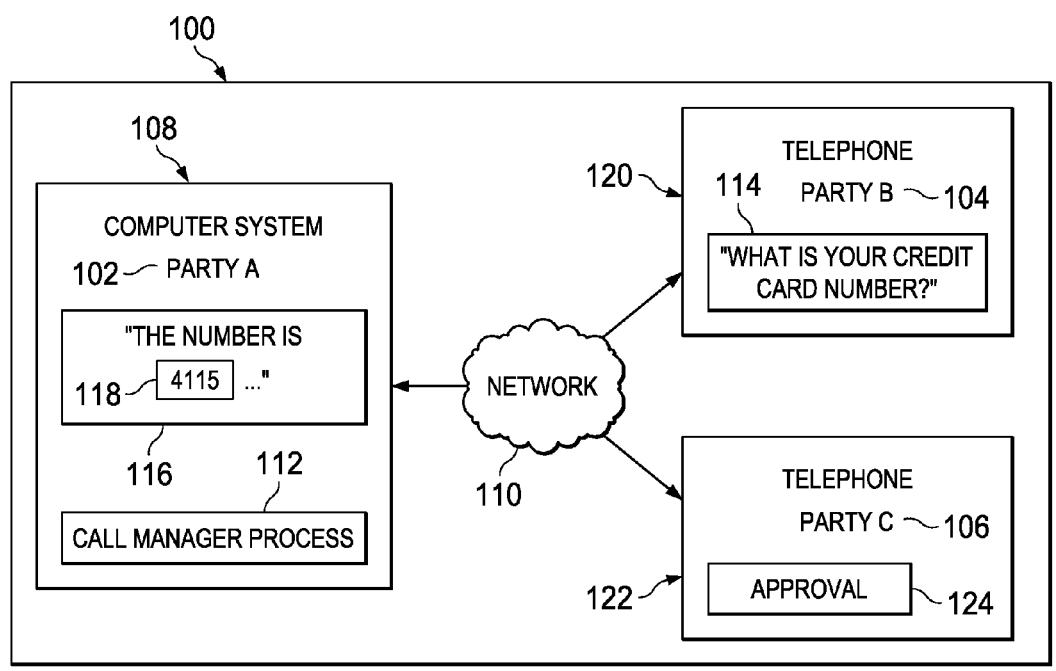
FIG. 1 is an illustration of an environment in which illustrative embodiments may be implemented in accordance with an illustrative embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Looking now to FIG. 1, an illustration of an environment in which illustrative embodiments may be implemented is depicted in accordance with an illustrative embodiment. Voice communication management environment 100 is an example of an environment in which illustrative embodiments may be implemented.

Voice communication management environment 100 contains party A 102, party B 104, and party C 106. Party A 102 is participating in voice communication with party B 104 over network 110. In this illustrative example, party A 102 is on a telephone call with party B 104 over a telephone network. Of course, in other illustrative embodiments, party A 102 may be participating in a voice over Internet protocol (VoIP) session with party B 104 or another type of voice communication.

In this illustrative example, party A 102 uses computer system 108 to participate in a telephone call with party B 104. Specifically, party A 102 uses a mobile device, such as a smartphone, to participate in the telephone call. Party B 104 is an unauthorized party attempting to receive confidential information in this illustrative example. Party B 104 is using telephone 120.

Call manager process 112 is a process running on computer system 108. Call manager process 112 is used to prevent or reduce the risk of party A 102 from giving confidential information to an unauthorized party that has fraudulently requested such confidential information. In this illustrative example, party B 104 is an unauthorized party that is requesting the confidential information of a credit card number.

During the voice communication, party B 104 asks party A 102 question 114. Question 114 is an audible request for confidential information. In this illustrative example, question 114 is "what is your credit card number?" Party A 102 is unaware that party B 104 is an unauthorized party attempting to fraudulently receive confidential information. Thus, party A 102 replies with statement 116. Statement 116 is "the number is 4115 . . . . " In other words, statement 116 contains confidential information.

Number 118 is a portion of statement 116. Number 118 is the beginning of the credit card number for party A 102 in this illustrative example. Call manager process 112 identifies that party A 102 has begun to speak confidential information during the voice communication because number 118 is in a policy which prohibits the transmission of the set of undesired audio phrases. Call manager process 112 then performs a set of actions. A set of actions is one or more actions in these examples. In some illustrative embodiments, call manager process 112 plays an audio message audible to both parties that confidential information has been disclosed. The audio message may also be audible to party A 102 and inaudible to party B 104.

In other illustrative examples, call manager process 112 sends a request to party C 106 to join the voice communication. In this illustrative example, party C 106 joins the voice communication by being added to the telephone call. Adding party C 106 to the telephone call, makes the telephone call a three-way telephone call. Party C 106 uses telephone 122 to participate in the voice communication.

In these illustrative examples, the three-way telephone call may be created by sending a message to network 110 to add party C 106 to the telephone call. Alternatively, call manager process 112 may add party C 106 by using another network, such as the Internet.

Party C 106 then communicates with party A 102 and party B 104 to identify party B 104 and determine whether party B 104 is an unauthorized party attempting to fraudulently receive confidential information from party A 102. In the event that party B 104 is not an unauthorized party, party C 106 speaks approval 124 to party A 102. In other words, party C 106 tells party A 102 that party A 102 may disclose the confidential information in the voice communication.

Figure 2:
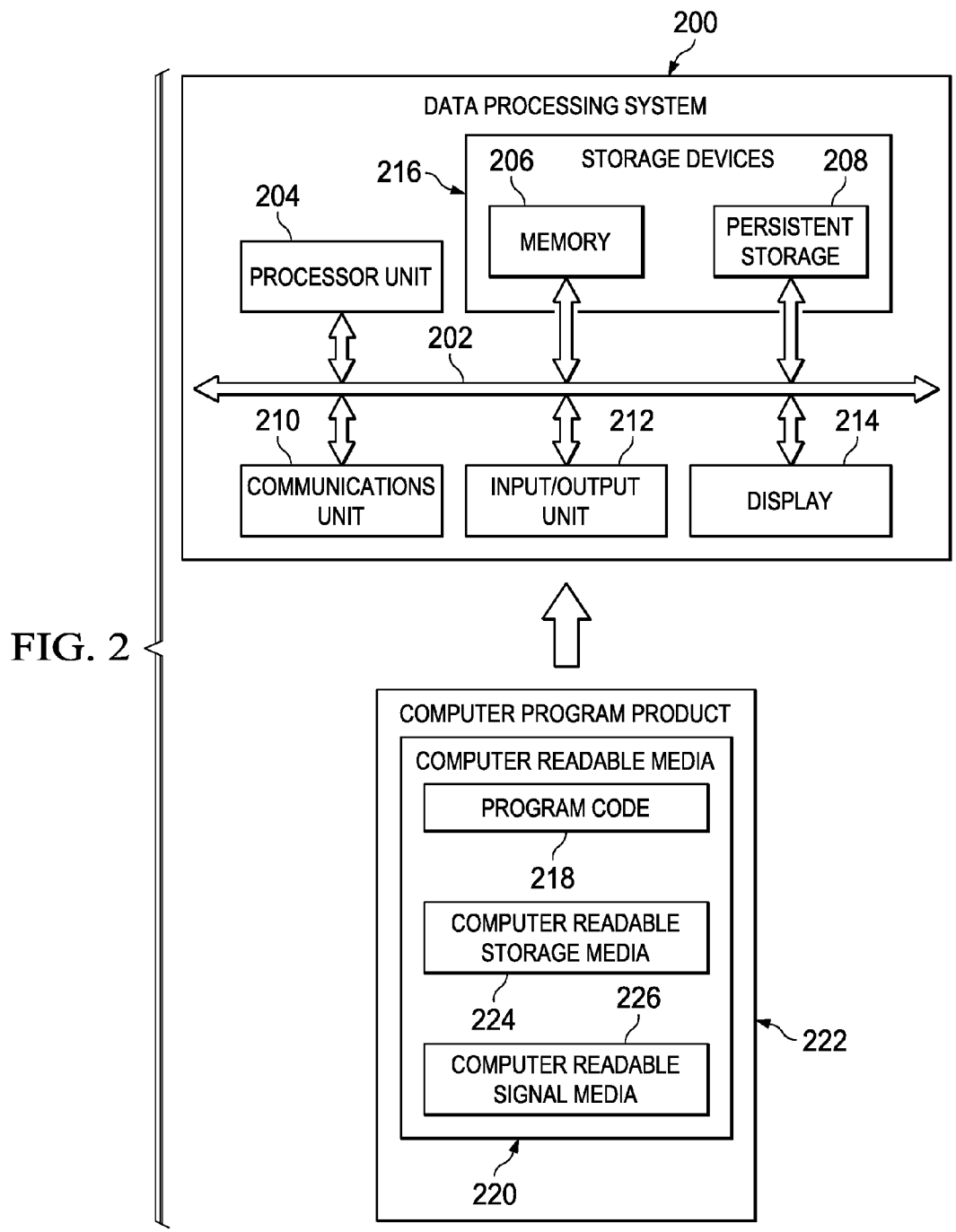
FIG. 2 is an illustration of a data processing system in accordance with an illustrative embodiment.

Turning now to FIG. 2, an illustration of a data processing system is depicted in accordance with an illustrative embodiment. In this illustrative example, data processing system 200 includes communications fabric 202, which provides communications between processor unit 204, memory 206, persistent storage 208, communications unit 210, input/output (I/O) unit 212, and display 214. Data processing system 200 is an example implementation of computer system 108 in FIG. 1.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Storage devices 216 may also be referred to as computer readable storage devices in these examples. Memory 206, in these examples, may be, for example, a random access memory or any other suitable volatile or non-volatile storage device. Persistent storage 208 may take various forms, depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

In another illustrative example, processor unit 204 may take the form of a hardware unit that has circuits that are manufactured or configured for a particular use. This type of hardware may perform operations without needing program code to be loaded into a memory from a storage device to be configured to perform the operations.

For example, when processor unit 204 takes the form of a hardware unit, processor unit 204 may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, for example, a programmable logic array, programmable array logic, a field programmable logic array, a field programmable gate array, and other suitable hardware devices. With this type of implementation, program code 218 may be omitted because the processes for the different embodiments are implemented in a hardware unit.

In still another illustrative example, processor unit 204 may be implemented using a combination of processors found in computers and hardware units. Processor unit 204 may have a number of hardware units and a number of processors that are configured to run program code 218. With this depicted example, some of the processes may be implemented in the number of hardware units, while other processes may be implemented in the number of processors.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache, such as found in an interface and memory controller hub that may be present in communications fabric 202.

The different illustrative embodiments recognize and take into account a number of different considerations. For example, the different illustrative embodiments recognize that some users are more proficient than other users at identifying an unauthorized party attempting to use a voice communication to receive confidential information from the user. A user that does not identify that the unauthorized party is unauthorized to receive the confidential information may provide the requested confidential information.

The different illustrative embodiments recognize and take into account that audio phrases that contain confidential information may be undesirable to transmit in a voice communication without the authorization of a trusted party. Audio phrases that are undesired to be sent in a voice communication are identified. The audio phrases may be identified by being present in a policy which prohibits the transmission of the set of undesired audio phrases. The policy which prohibits the transmission of the set of undesired audio phrases may be stored in a data source in text form, audio form, or a combination of audio and text.

The different illustrative embodiments identify an audio phrase in a voice communication and inhibit the transmission of audio to prevent confidential information from being disclosed. For example, the illustrative embodiments may identify that a user has spoken the first four digits of the credit card number for the user, and prevent the rest of the credit card number and other confidential information from being transmitted to the unauthorized party. The different illustrative embodiments provide a number of different examples for preventing the confidential information from being transmitted to the unauthorized party. For example, audio transmission from the user to the unauthorized party may be inhibited for a period of time. An alert or message may be generated that confidential information is or was disclosed.

The different illustrative embodiments also recognize that a user that is not proficient at identifying an unauthorized party in a voice communication may know a second user that is more proficient at identifying an unauthorized party than the first user. In such examples, once confidential information provided by a user is provided, such confidential information may be prevented from being transmitted partially or completely. An alert is then generated and sent to a third party trusted by the user. For example, a family member may receive the alert. The alert may be in the form of a telephone call. Once the trusted third party answers the call, the trusted third party is joined to the voice communication between the user and the unauthorized party. The trusted third party may then communicate with the unauthorized third party and make a determination regarding the trustworthiness of the unauthorized party.

Thus, the different illustrative embodiments provide a method, a computer program product, and an apparatus for managing a voice communication. In one illustrative embodiment, an audio phrase produced by a first user is identified in the voice communication between the first user and a second user. A determination is made whether the audio phrase is present in a policy which prohibits the transmission of the set of undesired audio phrases. Responsive to a determination that the audio phrase is present in the policy which prohibits the transmission of the set of undesired audio phrases, a communication of the audio phrase is modified.

Figure 3:
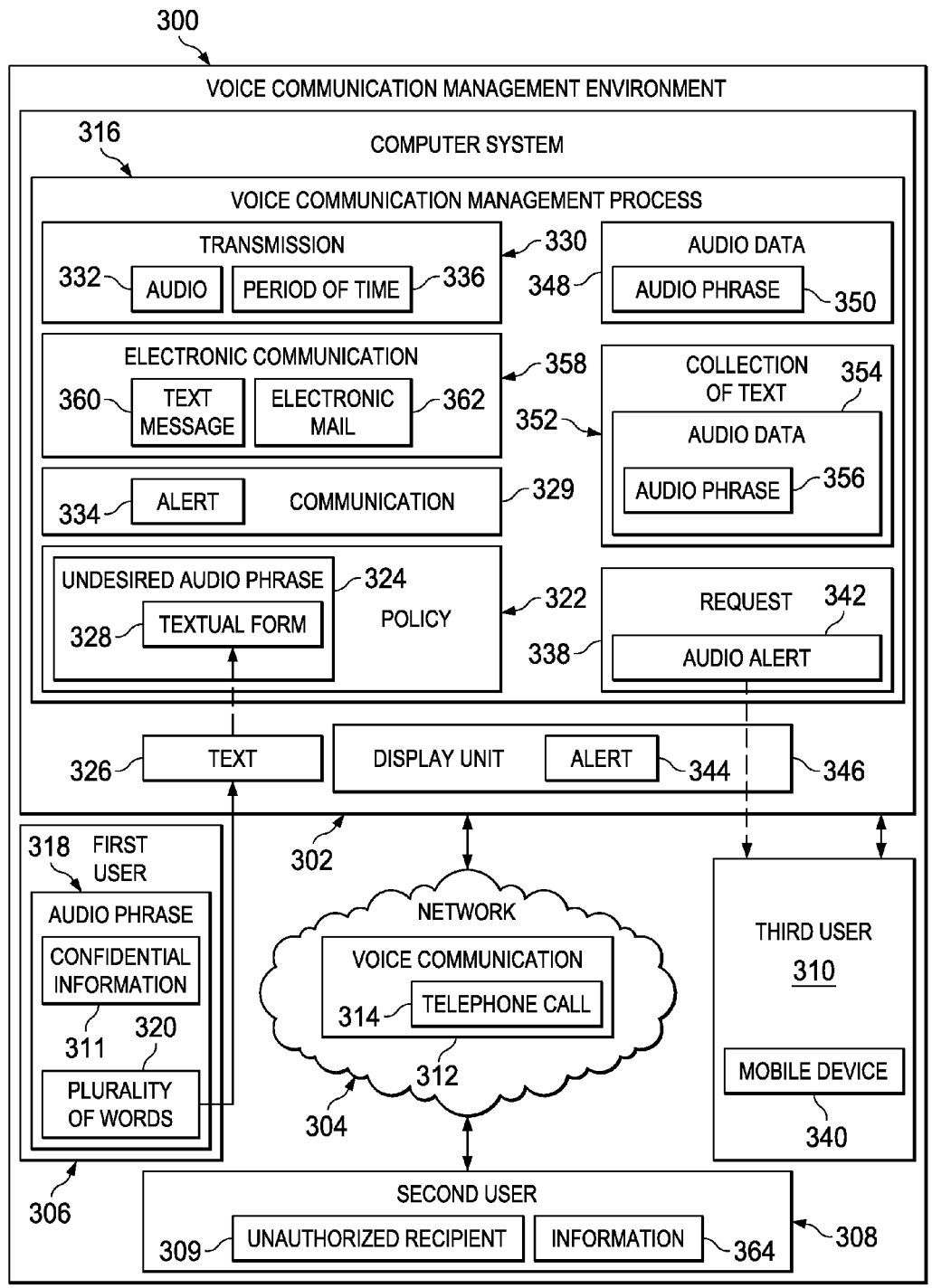
FIG. 3 is an illustration of a voice communication management environment in accordance with an illustrative embodiment.

Turning now to FIG. 3, an illustration of a voice communication management environment is depicted in accordance with an illustrative embodiment. Voice communication management environment 100 in FIG. 1 is an example implementation of voice communication management environment 300.

Voice communication management environment 300 contains computer system 302, network 304, first user 306, second user 308, and third user 310. First user 306 uses computer system 302 to conduct voice communication 312 with second user 308 in this illustrative embodiment. Voice communication 312 is a collection of messages in the form of spoken words between two or more users.

First user 306 and second user 308 conduct voice communication 312 using network 304. Conducting voice communication 312 means participating in voice communication 312 by speaking and/or listening. In this illustrative example, voice communication 312 is telephone call 314 over a telephone network. However, in other illustrative embodiments, voice communication 312 is conducted over the Internet or another suitable computer network.

Computer system 302 is an example implementation of data processing system 200 in FIG. 2. Computer system 302 is a mobile phone in this illustrative embodiment. Computer system 302 runs voice communication management process 316 as voice communication 312 is conducted between first user 306 and second user 308. As voice communication 312 is conducted between first user 306 and second user 308, first user 306 and/or second user 308 speak to the other party in voice communication 312.

In this illustrative embodiment, second user 308 is unauthorized recipient 309. Unauthorized recipient 309 is a party that desires to fraudulently receive confidential information 311 from first user 306. For example, second user 308 may request the social security number of first user 306 for the purpose of committing identity theft of first user 306. However, second user 308 may allege in voice communication 312 to be a bank representative updating account information for first user 306.

During voice communication 312, voice communication management process 316 identifies audio phrase 318 produced by first user 306. Audio phrase 318 consists of plurality of words 320 in this illustrative embodiment. For example, audio phrase 318 may be a phrase spoken by first user 306, such as "I am doing well. How are you?" However, in this illustrative example, audio phrase 318 contains confidential information 311. For example, audio phrase 318 may consist of several digits of the Social Security number for first user 306.

Thus, voice communication management process 316 receives audio phrase 318 spoken by first user 306. Voice communication management process 316 then determines whether audio phrase 318 is contained in policy 322. Policy 322 consists of a set of undesired audio phrases, such as undesired audio phrase 324. The undesired audio phrases may contain confidential information for the user. For example, undesired audio phrase 324 may be a whole or part of a Social Security number, a password, a credit card number or other suitable confidential information.

In some illustrative embodiments, audio phrase 318 is identified by comparing audio phrase 318 to the audio signature of undesired audio phrase 324. An audio signature is one or more values generated by performing one or more calculations on an audio segment. The audio signature of one audio segment may be compared with the audio signature of another audio segment. If the audio signature of the one audio segment is the same or similar to the audio signature of the other audio segment, voice communication management process 316 identifies that the audio segments match. In this illustrative embodiment, voice communication management process 316 identifies that audio phrase 318 is contained in policy 322 of undesired audio phrases.

In other illustrative embodiments, however, when voice communication management process 316 receives audio phrase 318 containing plurality of words 320, voice communication management process 316 generates text 326. Text 326 is a textual representation of plurality of words 320. Voice communication management process 316 may generate text 326 using speech-to-text techniques known to one of ordinary skill in the art. For example, voice communication management process 316 may use IBM ViaVoice™, by International Business Machines, Inc. in Armonk, N.Y., to generate text 326. In such illustrative embodiments, undesired audio phrase 324 is stored in policy 322 in textual form 328. For example, policy 322 may be a database containing textual entries for undesired audio phrase 324.

Once voice communication management process 316 determines that audio phrase 318 is present in policy 322, voice communication management process 316 modifies communication 329 of audio phrase 318 to second user 308. Voice communication management process 316 may modify communication 329 at least by inhibiting transmission 330 of audio 332 from first user 306. Inhibiting transmission 330 of audio 332 prevents first user 306 from revealing additional confidential information to second user 308 by not transmitting audio 332 produced by first user 306. Voice communication management process 316 may generate alert 334 that is audible to first user 306, second user 308, or both first user 306 and second user 308. Alert 334 may indicate that confidential information is or was about to be disclosed by first user 306.

In some illustrative embodiments, voice communication management process 316 inhibits transmission 330 of audio 332 for period of time 336. However, in other illustrative embodiments, voice communication management process 316 may inhibit transmission 330 of audio 332 until another condition is satisfied. For example, voice communication management process 316 may inhibit transmission 330 of audio 332 until first user 306 inputs a particular value into computer system 302.

For example, first user 306 may be requested to enter a confirmation that first user 306 will not divulge additional confidential information. In other illustrative embodiments, voice communication management process 316 presents alert 344 using display unit 346. Display unit 346 is an example implementation of display 214 in FIG. 2. Alert 344 contains a notification for first user 306 that audio phrase 318 has been identified as being contained in policy 322 and that confidential information is not to be divulged to other parties.

In other illustrative embodiments, when voice communication management process 316 determines that audio phrase 318 is present in policy 322, voice communication management process 316 generates request 338 for third user 310 to join voice communication 312. Request 338 is sent to third user 310, who may receive request 338 on mobile device 340. Mobile device 340 may be a smartphone, for example. Request 338 may be in the form of a telephone call, or a notification presented using an application running on mobile device 340. While request 338 is being sent to third user 310, audio alert 342 may be produced in voice communication 312. Audio alert 342 is an indication that third user 310 is being requested to join voice communication 312. For example, audio alert 342 may be a recording of the statement "Please hold. Another party is being connected to the call to verify the identity of the caller." Audio alert 342 may be audible to first user 306, second user 308, or both first user 306 and second user 308.

Once third user 310 is joined to voice communication 312, third user 310 may communicate with both first user 306 and second user 308. Likewise, first user 306 and second user 308 may communicate with third user 310. For example, third user 310 may ask second user 308 for additional information concerning the identity of second user 308.

In some illustrative embodiments, third user 310 is joined by connecting a three-way telephone call using network 304. In other illustrative embodiments, voice communication management process 316 places an additional call to third user 310 and connects first user 306, second user 308, and third user 310 in a single call. Of course, in yet other illustrative embodiments, voice communication management process 316 may use another network, such as the Internet, to send request 338 to third user 310 and/or send and receive audio data for voice communication 312 with third user 310.

In yet other illustrative embodiments, third user 310 is not added to voice communication 312. Instead, voice communication management process 316 generates electronic communication 358 and sends electronic communication 358 to third user 310. For example, electronic communication 358 may be text message 360, electronic mail 362, or another suitable communication. Electronic communication 358 may contain information 364 about voice communication 312, second user 308, audio phrase 318 and/or other suitable information. For example, electronic communication 358 may contain the caller identification information and/or telephone number for second user 308.

Additional undesired audio phrases may be added to policy 322. In some illustrative embodiments, a user causes voice communication management process 316 to enter an editing mode. Audio data 348 is then received from a user, such as first user 306 or third user 310. Audio data 348 is stored as audio phrase 350 by voice communication management process 316. Audio phrase 350 is added to policy 322 as an additional undesired audio phrase.

In other illustrative embodiments, audio data 348 is not received while voice communication management process 316 is in the editing mode. Instead, collection of text 352 is received by voice communication management process 316. Collection of text 352 is a textual representation of confidential information for first user 306. For example, collection of text 352 may be a credit card number of first user 306. Voice communication management process 316 uses collection of text 352 to generate audio data 354. Audio data 354 is an audio representation of collection of text 352. Voice communication management process 316 generates audio data 354 from collection of text 352 using text-to-speech techniques known to one of ordinary skill in the art. For example, Natural Voices™, by AT&T Labs in Dallas, Tex., may be used by voice communication management process 316 to generate audio data 354. Once audio data 354 is generated, audio data 354 is stored as audio phrase 356. Like audio phrase 350, audio phrase 356 is added to policy 322 as an additional undesired audio phrase. For example, audio phrase 350 may be added to a database containing the undesired audio phrases for policy 322.

The illustration of computer system 302 in voice communication management environment 300 is not meant to imply physical or architectural limitations to the manner in which different features may be implemented. Other components in addition to and/or in place of the ones illustrated may be used. Some components may be unnecessary in some illustrative embodiments. Also, the blocks are presented to illustrate some functional components. One or more of these blocks may be combined and/or divided into different blocks when implemented in different illustrative embodiments.

For example, voice communication management process 316 may perform any combination of actions when a determination is made that audio phrase 318 is in policy 322 of undesired audio phrases. In one illustrative example, voice communication management process 316 generates alert 344, inhibits transmission 330 of audio 332 for period of time 336, and generates request 338 to add third user 310 to voice communication 312. Additionally, voice communication management process 316 may generate request 338 for a fourth user to be added to voice communication 312 in the event that third user 310 is unavailable.

As another example, second user 308 may not be an unauthorized party attempting to fraudulently receive confidential information 311. In other illustrative examples, second user 308 may be a legitimate requestor of confidential information 311. For example, second user 308 may be a telephone sales representative requesting the credit card number of first user 306. In such an example, third user 310 may be a parent or guardian of first user 306 who wishes to be informed when first user 306 is attempting to make purchases with the credit card of third user 310. In such an example, policy 322 may contain the confidential information of another user, such as third user 310.

Figure 4:
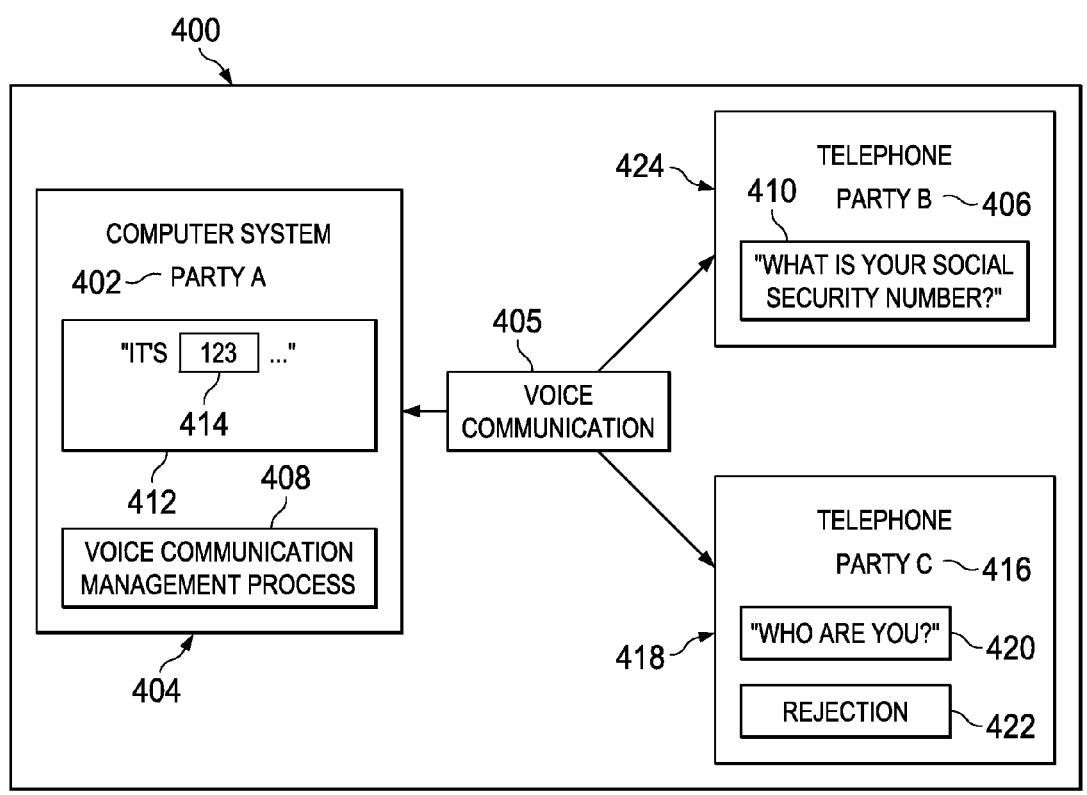
FIG. 4 is an illustration of a first example of a voice communication between two users in accordance with an illustrative embodiment.
Figure 5:
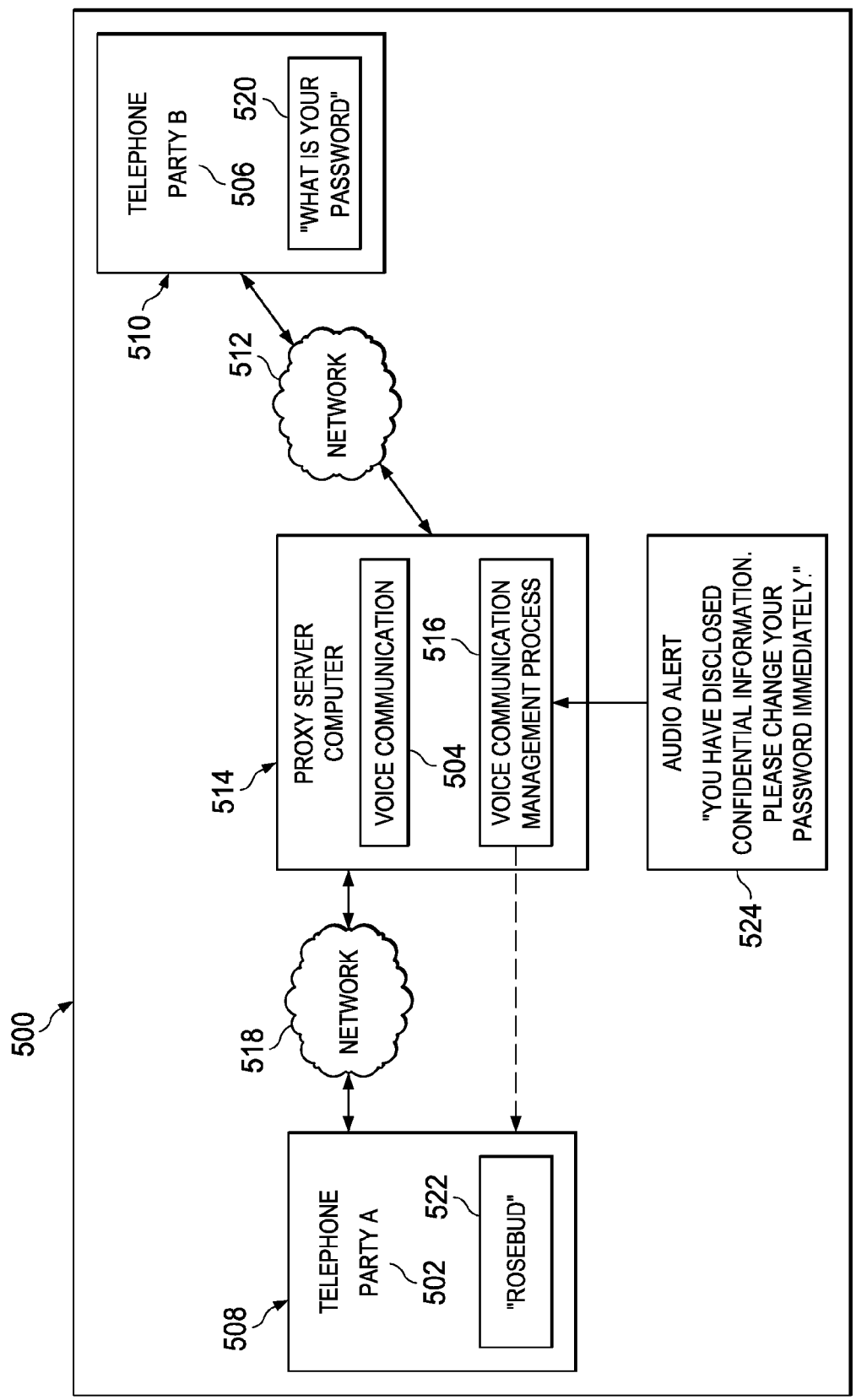
FIG. 5 is an illustration of a second example of a voice communication between two users in accordance with an illustrative embodiment.

FIGS. 4 and 5 illustrate two examples of conversations between users, such as first user 306 and second user 308 in FIG. 3. In the examples, a voice communication management process prevents confidential information from being disclosed to the potentially unauthorized party.

Looking specifically at FIG. 4, an illustration of a first voice communication between two users is depicted in accordance with an illustrative embodiment. Voice communication management environment 400 is an example implementation of voice communication management environment 300 in FIG. 3.

In this illustrative embodiment, party A 402 uses computer system 404 to conduct voice communication 405 with party B 406. Party B 406 is an unauthorized party attempting to fraudulently receive confidential information using telephone 424. In this illustrative example, party B 406 is attempting to receive the Social Security number of party A 402. Computer system 404 runs voice communication management process 408. Voice communication management process 408 is an example implementation of voice communication management process 316 in FIG. 3.

In this illustrative example, the first three digits of the Social Security number for party A 402 are stored in a policy which prohibits the transmission of the set of undesired audio phrases, such as policy 322 in FIG. 3. Party B 406 requests the Social Security number by asking question 410 to party A 402. Party A 402 is a party who is not skilled in determining whether party B 406 is an unauthorized party. Thus, party A 402 replies with statement 412. Voice communication management process 408 identifies number 414 as an audio phrase in statement 412. Voice communication management process 408 then determines that number 414 is contained in a policy which prohibits the transmission of the set of undesired audio phrases.

Voice communication management process 408 then inhibits communication of audio by party A 402 for a period of time. In this illustrative example, the period of time is the length of time taken by voice communication management process 408 to place a call to party C 416. Party C 416 receives the telephone call using telephone 418. Voice communication management process 408 adds party C 416 to voice communication 405 and allows party C 416 to communicate with both party A 402 and party B 406. Party C 416 asks question 420 to party B 406. Party C 416 determines that party B 406 is an unauthorized party, and issues rejection 422 of question 410. In this illustrative example, party C 416 issues rejection 422 by asking party A 402 to discontinue voice communication 405 by hanging up and/or ending the call.

Looking now to FIG. 5, a second example of a voice communication between two users is depicted in accordance with an illustrative embodiment. Voice communication management environment 500 is an example implementation of voice communication management environment 300 in FIG. 3.

In this illustrative example, party A 502 is conducting voice communication 504 with party B 506. Party A 502 is using telephone 508, and party B 506 is using telephone 510. To initiate voice communication 504 in this illustrative example, party B 506 called a telephone number using network 512. Network 512 may be a plain old telephone service (POTS) network. The telephone number directed the call by party B 506 to proxy server computer 514. Proxy server computer 514 runs voice communication management process 516. An example of proxy server computer 514 in this illustrative embodiment is Google Voice™ from Google, Inc. in Mountain View, Calif. After answering the call from party B 506, voice communication 504 places a call on network 518 to telephone 508. In some illustrative examples, network 512 and network 518 are the same network. For example, both network 512 and network 518 may be a plain old telephone service network.

Party A 502 receives the call using telephone 508, and voice communication 504 is established between party A 502 and party B 506. Thus, party A 502 and party B 506 may speak and listen to one another. In this illustrative embodiment, voice communication management process 516 running on voice communication 504 identifies audio phrases in a policy which prohibits the transmission of the set of undesired audio phrases produced by party A 502 on telephone 508.

Party B 506 asks question 520 of party A 502. Question 520 requests a password from party A 502. In this illustrative embodiment, party A 502 replies with the requested password in statement 522. Voice communication management process 516 generates text for statement 522 and identifies that statement 522 contains an undesired audio phrase. Statement 522 contains a password in the policy which prohibits the transmission of the set of undesired audio phrases.

Thus, voice communication management process 516 inhibits communication over voice communication 504 for a period of time. During the period of time, voice communication management process 516 generates audio alert 524. Audio alert 524 is an alert that indicates that confidential information has been disclosed, and that party A 502 should change his password immediately. Audio alert 524 is audible only to party A 502. Party B 506 may hear silence or another audio segment generated by voice communication management process 516.

Figure 6:
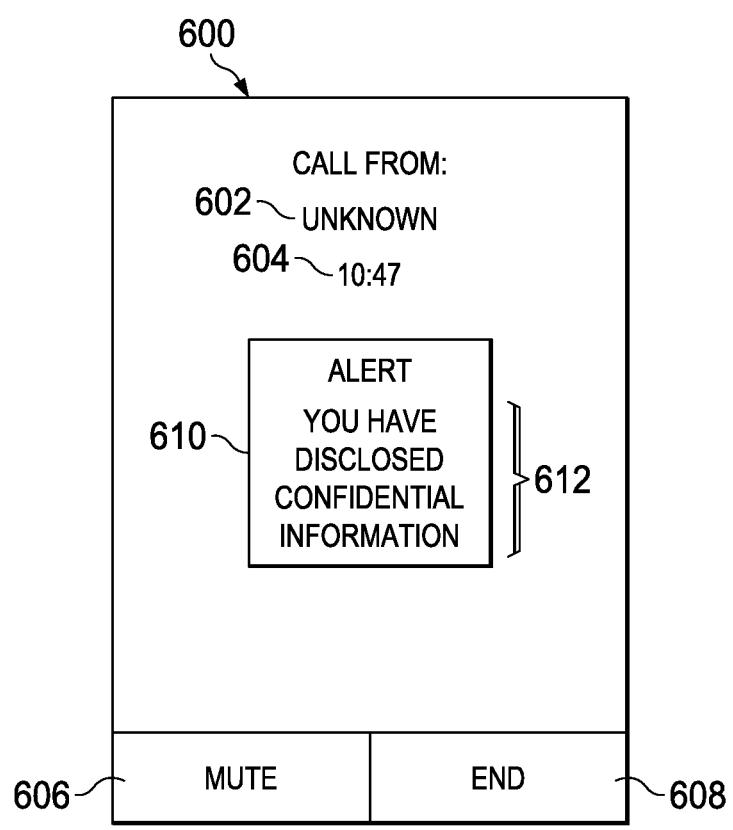
FIG. 6 is an illustration of a screenshot of an alert in accordance with an illustrative embodiment.

Turning now to FIG. 6, an illustration of a screenshot of an alert is depicted in accordance with an illustrative embodiment. Screenshot 600 may be presented using a display unit, such as display unit 346 in FIG. 3.

Screenshot 600 contains caller information 602, call time 604, and alert 610. Screenshot 600 also presents options for the user, such as mute 606, and end call 608. Caller information 602 may present the telephone number of the caller, when available. In this illustrative example, the caller is an unauthorized party and the mobile device presenting screenshot 600 is running a voice communication management process, such as voice communication management process 316 in FIG. 3.

In this illustrative example, screenshot 600 presents alert 610. Alert 610 is presented because the user has recently spoken an audio phrase that is contained in a policy which prohibits the transmission of the set of undesired audio phrases. Thus, the voice communication management process inhibited the transmission of audio by the user for a period of time, and presented alert 610. Alert 610 contains statement 612. Statement 612 indicates that the user has disclosed confidential information. In some illustrative embodiments, statement 612 also includes a textual representation of the audio phrase that was determined to be in the policy which prohibits the transmission of the set of undesired audio phrases.

Figure 7:
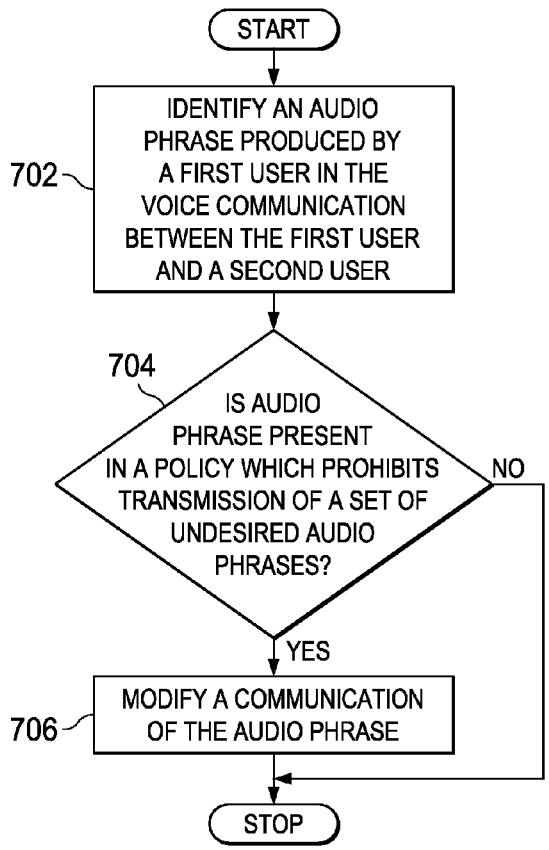
FIG. 7 is a flowchart of a process for managing a voice communication in accordance with an illustrative embodiment.

Turning now to FIG. 7, a flowchart of a process for managing a voice communication is depicted in accordance with an illustrative embodiment. The process may be performed by voice communication management process 316 running on computer system 302 in FIG. 3.

The process begins by identifying an audio phrase produced by a first user in the voice communication between the first user and a second user (step 702). The audio phrase may be identified by processing the audio phrase with speech-to-text algorithms. Alternatively, an audio signature may be generated for the audio phrase. The process then determines whether the audio phrase is present in a policy which prohibits the transmission of the set of undesired audio phrases (step 704). The policy which prohibits the transmission of the set of undesired audio phrases may be stored in a data source, such as a database or a list. If the process determines that the audio phrase is not present in the policy which prohibits the transmission of the set of undesired audio phrases, the process terminates.

If the process determines at step 704 that the audio phrase is present in the policy which prohibits the transmission of the set of undesired audio phrases, the process modifies a communication of the audio phrase (step 706). The process may modify the communication of the audio phrase by inhibiting transmission of the phrase, replacing the audio phrase with an audio alert, inhibiting audio produced by the first user from being transmitted to the second user, or by requesting that a third user join the voice communication between the first user and the second user. The process terminates thereafter.

Figure 8:
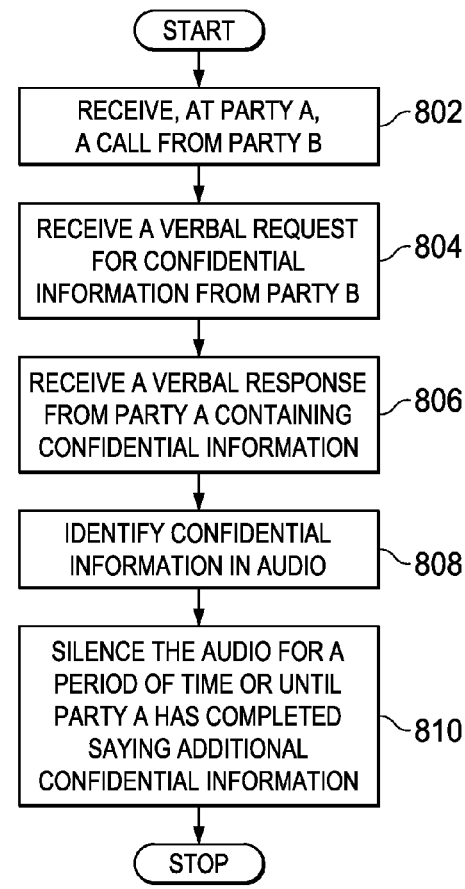
FIG. 8 is a flowchart of a process for managing a telephone call in accordance with an illustrative embodiment.

Looking now to FIG. 8, a flowchart of a process for managing a telephone call is depicted in accordance with an illustrative embodiment. The process may be performed by voice communication management process 316 running on computer system 302 in FIG. 3.

The process begins by receiving, at party A, a call from party B (step 802). The call may be received over a plain old telephone service network, a computer network, or another suitable network. The process receives a verbal request for confidential information from party B (step 804). The request for confidential information may be a request for the credit card number of party A in some illustrative embodiments.

The process then receives a verbal response from party A containing confidential information (step 806). The verbal response may be a portion or the entirety of the credit card number. The process identifies confidential information in audio (step 808). The confidential information may be stored in a policy which prohibits the transmission of a set of undesired phrases. The process then silences the audio for a period of time or until party A has completed saying additional confidential information (step 810). Of course, in other illustrative embodiments, the process may silence the audio until another suitable condition is satisfied.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

For example, the process may not silence the audio for a period of time at step 812. Instead, the process may call a third party to join the telephone call. Additionally, the process may send an electronic communication to the third user. For example, the process may send an electronic mail and/or a text message to the third user containing information about party B. The information may be the audio phrase and/or caller identification information for party B.

Thus, the different illustrative embodiments allow a user who is not proficient at identifying fraudulent attempts to receive confidential information from disclosing the confidential information. The third party may be a trusted individual, such as a family member who wishes to help the user identify unauthorized users and prevent the unauthorized users from receiving confidential information. Additionally, the third party may wish to protect the confidential information of the third party. For example, the user may be a child who attempts to make a purchase with the credit card of the third user. The third user is then alerted and may prevent the transaction from taking place.

Thus, the different illustrative embodiments provide a method, a computer program product, and an apparatus for managing a voice communication. In one illustrative embodiment, an audio phrase produced by a first user is identified in the voice communication between the first user and a second user. A determination is made whether the audio phrase is present in a policy which prohibits the transmission of the set of undesired audio phrases. Responsive to a determination that the audio phrase is present in the policy which prohibits the transmission of the set of undesired audio phrases, a communication of the audio phrase is modified.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method for managing a voice communication, the method comprising:

identifying, by a mobile voice communication device associated with a first user, an audio phrase produced by the first user during the voice communication between the first user using the mobile voice communication device and a second user using another voice communication device;

generating, by the mobile voice communication device associated with the first user, an audio signature of the audio phrase produced by the first user, wherein the audio signature is one or more values generated by performing one or more calculations on an audio segment including the audio phrase;

comparing, by the mobile voice communication device associated with the first user, the audio signature of the audio phrase produced by the first user to audio signatures corresponding to a set of undesirable audio phrases containing confidential information associated with the first user included within a policy prohibiting a transmission of the set of undesired audio phrases;

determining, by the mobile voice communication device associated with the first user, that the audio signature of the audio phrase produced by the first user matches an audio signature of an undesirable audio phrase in the set of undesirable audio phrases, wherein the matches the audio signature of the undesirable audio phrase in the set of undesirable audio phrases means either a same or a similar audio signature to the audio signatures corresponding to the set of undesirable audio phrases;

responsive to the mobile voice communication device associated with the first user determining that the audio signature of the audio phrase produced by the first user matches an audio signature of an undesirable audio phrase in the set of undesirable audio phrases, outputting, by the mobile voice communication device associated with the first user, a textual alert message to the first user via a display of the mobile voice communication device associated with the first user that includes a textual representation of the confidential information disclosed and that the confidential information is not to be divulged;

inhibiting, by the mobile voice communication device associated with the first user, the transmission of the undesirable audio phase containing the confidential information from the mobile voice communication device associated with the first user to the other voice communication device used by the second user during the voice communication; and inhibiting, by the mobile voice communication device associated with the first user, further transmission of audio from the mobile voice communication device associated with the first user to the other voice communication device used by the second user for a period of time until a third user that is a trusted party of the first user joins the voice communication to determine whether the second user is an unauthorized party attempting to fraudulently receive the confidential information from the first user.

2. The method of claim 1, wherein the step of identifying the audio phrase produced by the first user in the voice communication comprises:

generating, by the mobile voice communication device associated with the first user, text that corresponds to a plurality of words in the audio phrase using a speech-to-text process.

3. The method of claim 1, wherein the set of undesired audio phrases in the policy are stored in textual form.

4. The method of claim 1, wherein the audio phrase is a first audio phrase and further comprising:
- receiving, by the mobile voice communication device associated with the first user, audio data for a second audio phrase; and
- storing, by the mobile voice communication device associated with the first user, the audio data in the policy, which prohibits the transmission of the set of undesired audio phrases as the second audio phrase.

5. The method of claim 4 further comprising:
- determining, by the mobile voice communication device associated with the first user, whether the second audio phrase matches the first audio phrase in the policy, which prohibits the transmission of the set of undesired audio phrases.

6. The method of claim 1, wherein the audio phrase is a first audio phrase and further comprising:
- receiving, by the mobile voice communication device associated with the first user, a collection of text;
- generating, by the mobile voice communication device associated with the first user, audio data for the collection of text using a text-to-speech process; and
- storing, by the mobile voice communication device associated with the first user, the audio data in the policy, which prohibits the transmission of the set of undesired audio phrases as a second audio phrase.

7. The method of claim 1, wherein the inhibiting, by the mobile voice communication device associated with the first user, of the transmission of the undesirable audio phrase further comprises:
- generating, by the mobile voice communication device associated with the first user, a request for the third user to join the voice communication; and
- responsive to the mobile voice communication device associated with the first user sending the request for the third user to join the voice communication, adding, by the mobile voice communication device associated with the first user, the third user to the voice communication.

8. The method of claim 7, wherein the generating, by the mobile voice communication device associated with the first user, the request for the third user to join the voice communication further comprises:
- generating, by the mobile voice communication device associated with the first user, an audio alert in the voice communication for the first user and the second user indicating that the third user is being requested to join the voice communication; and
- sending, by the mobile voice communication device associated with the first user, the request to the third user with caller identification information corresponding to the second user.

9. The method of claim 8, wherein the audio alert is audible to the first user and inaudible to the second user.

10. The method of claim 1, wherein the voice communication is a telephone call.

11. The method of claim 1, wherein the inhibiting, by the mobile voice communication device associated with the first user, of the transmission of the undesirable audio phrase further comprises:
- outputting, by the mobile voice communication device associated with the first user, an audio alert message audible to the first user and inaudible to the second user that the confidential information has been disclosed.

12. The method of claim 1, wherein the second user is the unauthorized party attempting to fraudulently receive the confidential information from the first user to perform unauthorized activities on behalf of the first user using the confidential information without consent of the first user.

13. The method of claim 1, wherein the inhibiting, by the mobile voice communication device associated with the first user, of the transmission of the undesirable audio phrase further comprises:
- generating, by the mobile voice communication device associated with the first user, an electronic communication to the third user, wherein the electronic communication is a text message sent to a mobile communication device associated with the third user.

14. The method of claim 13, wherein the inhibiting, by the mobile voice communication device associated with the first user, of the transmission of the undesirable audio phrase further comprises:
- generating, by the mobile voice communication device associated with the first user, a request to a fourth user in response to the third user being unavailable.

15. A computer program product stored on a non-transitory computer readable storage medium having program code embodied thereon that is executable by a mobile voice communication data processing system for managing a voice communication, the computer program product comprising:
- program code for identifying an audio phrase produced by a first user during the voice communication between the first user using the mobile voice communication data processing system and a second user using another voice communication data processing system;
- program code for generating an audio signature of the audio phrase produced by the first user, wherein the audio signature is one or more values generated by performing one or more calculations on an audio segment including the audio phrase;
- program code for comparing the audio signature of the audio phrase produced by the first user to audio signatures corresponding to a set of undesirable audio phrases containing confidential information associated with the first user included within a policy prohibiting a transmission of the set of undesired audio phrases;
- program code for determining that the audio signature of the audio phrase produced by the first user matches an audio signature of an undesirable audio phrase in the set of undesirable audio phrases, wherein the matches the audio signature of the undesirable audio phrase in the set of undesirable audio phrases means either same or similar audio signature to the audio signatures corresponding to the set of undesirable audio phrases;
- program code, responsive to determining that the audio signature of the audio phrase produced by the first user matches an audio signature of an undesirable audio phrase in the set of undesirable audio phrases, for outputting a textual alert message to the first user via a display of the mobile voice communication data processing system used by the first user that includes a textual representation of the confidential information disclosed and that the confidential information is not to be divulged;
- program code for inhibiting the transmission of the undesirable audio phase containing the confidential information from the mobile voice communication data processing system used by the first user to the other voice communication data processing system used by the second user during the voice communication; and
- program code for inhibiting further transmission of audio from the mobile voice communication data processing system used by the first user to the other voice communication data processing system used by the second user for a period of time until a third user that is a trusted party of the first user joins the voice communication to determine whether the second user is an unauthorized party attempting to fraudulently receive the confidential information from the first user.

16. The computer program product of claim 15, wherein the non-transitory computer readable storage medium is in the mobile voice communication data processing system, and the program code is downloaded over a network from a remote data processing system to the non-transitory computer readable storage medium in the mobile voice communication data processing system.

17. The computer program product of claim 16, wherein the remote data processing system is a server data processing system.

18. A mobile voice communication data processing system for managing a voice communication, the mobile voice communication data processing system comprising:
- a bus system;
- a storage device connected to the bus system, wherein the storage device includes program code; and
- a processor unit connected to the bus system, wherein the processing unit executes the program code to:
  identify an audio phrase produced by a first user during the voice communication between the first user using the mobile voice communication data processing system and a second user using another voice communication data processing system;
  generate an audio signature of the audio phrase produced by the first user, wherein the audio signature is one or more values generated by performing one or more calculations on an audio segment including the audio phrase;
  compare the audio signature of the audio phrase produced by the first user to audio signatures corresponding to a set of undesirable audio phrases containing confidential information associated with the first user included within a policy prohibiting a transmission of the set of undesired audio phrases;
  determine that the audio signature of the audio phrase produced by the first user matches an audio signature of an undesirable audio phrase in the set of undesirable audio phrases, wherein the matches the audio signature of the undesirable audio phrase in the set of undesirable audio phrases means either a same or a similar audio signature to the audio signatures corresponding to the set of undesirable audio phrases;
  output a textual alert message to the first user via a display of the mobile voice communication data processing system that includes a textual representation of the confidential information disclosed and that the confidential information is not to be divulged in response to determining that the audio signature of the audio phrase produced by the first user matches an audio signature of an undesirable audio phrase in the set of undesirable audio phrases;
  inhibit the transmission of the undesirable audio phase containing the confidential information from the mobile voice communication data processing system used by the first user to the other voice communication data processing system used by the second user during the voice communication; and
  inhibit further transmission of audio from the mobile voice communication data processing system used by the first user to the other voice communication data processing system used by the second user for a period of time until a third user that is a trusted party of the first user joins the voice communication to determine whether the second user is an unauthorized party attempting to fraudulently receive the confidential information from the first user.

* * * * *